Aug. 19, 1969   A. K. PANDJIRIS ET AL   3,461,738
GEAR AND METHOD OF MANUFACTURE
Filed Feb. 7, 1968
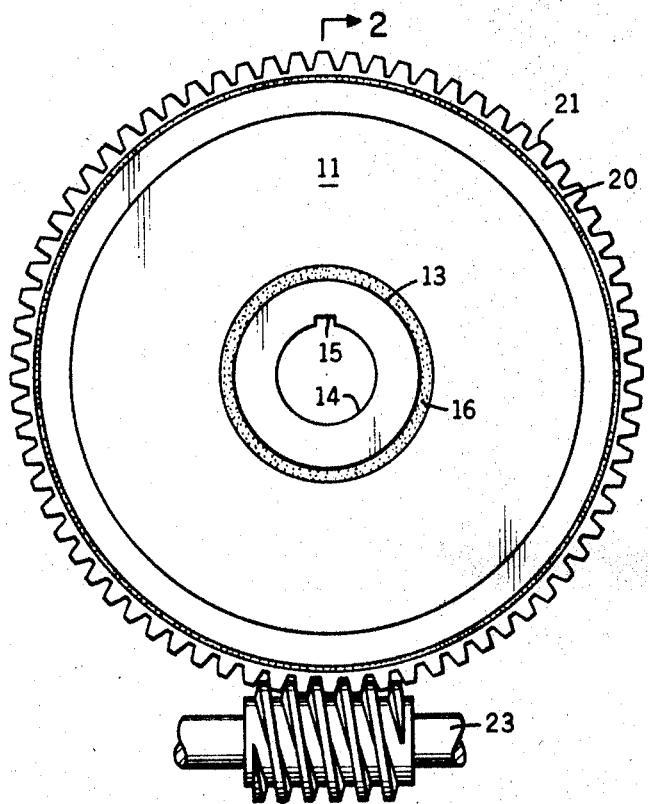
FIG. 1
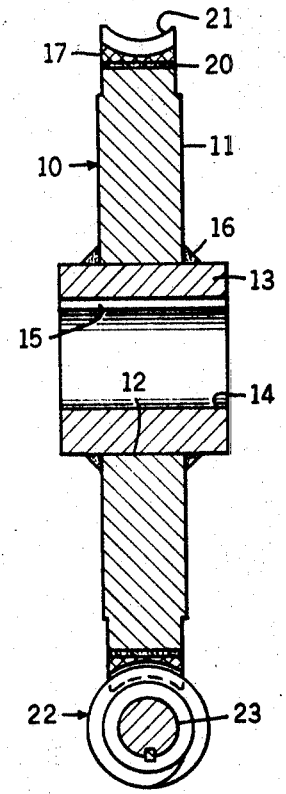
FIG. 2
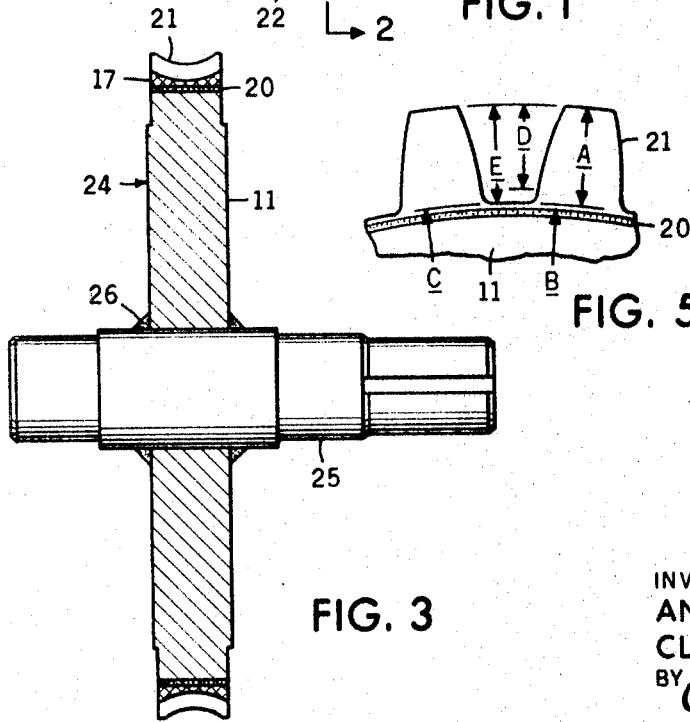
FIG. 3
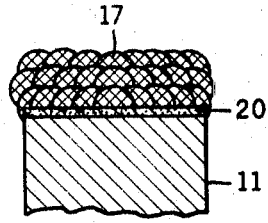
FIG. 5
FIG. 4
INVENTORS
ANTHONY K. PANDJIRIS
CLEVELAND N. COOPER
BY *Cohn and Powell*
ATTORNEYS US United States Patent Office 3,461,738
Patented Aug. 19, 1969

3,461,738
GEAR AND METHOD OF MANUFACTURE
Anthony K. Pandjiris, St. Louis, and Cleveland N. Cooper, Kirkwood, Mo., assignors to The Pandjiris Weldment Co., St. Louis, Mo., a corporation of Missouri
Filed Feb. 7, 1968, Ser. No. 703,644
Int. Cl. F16h 55/12
U.S. Cl. 74—446        15 Claims

ABSTRACT OF THE DISCLOSURE

A gear having a steel hub plate with a bronze layer applied by welding deposit on the periphery of the hub plate, the interface between the steel hub plate and bronze peripheral layer being provided by a radially thin dilution zone. The gear teeth are cut in the bronze peripheral layer. The bronze peripheral layer has a radial thickness determined by the location of the outside diameter of the dilution zone in a range between a minimal distance inwardly of the root diameter of the gear teeth and substantially the working depth of the gear teeth.

The method of manufacturing the gear includes the steps of depositing a bronze layer by welding on the periphery of a steel hub plate, while the hub plate and a welding tool are relatively rotating, and then cutting the gear teeth in the bronze peripheral layer within the limits mentioned previously.

Background of the invention

This invention relates generally to improvements in a gear construction, and to a method of manufacturing such gear.

In gearing having essentially sliding action between coacting gear teeth, such as worm or spiral gears, one of the pair of associated gears is often made of bronze. Bronze is a costly material, and accordingly, a gear made of bronze is expensive.

There have been attempts made in the past to obtain a saving in the cost of such gears by reducing the bronze requirement. For example, a preformed bronze ring, in which the gear teeth are cut, has been attached by fasteners such as bolts or pins to a steel hub plate. However, such ring required a considerable radial thickness of bronze inwardly of the teeth to accommodate the fasteners. While such composite gear is less expensive than the all bronze gear, it is still costly because of the amount of bronze used. Moreover, this type of gear has a severe functional disadvantage as a result of the mechanical joint provided by the fastener attachment of the ring.

Still another heretofore conventional gear construction utilizes a performed bronze ring welded to the hub plate by weld seams on opposite sides of the gear. It is obvious that such a ring had to have sufficient radial thickness to enable this side weld and to preclude damage to or interference with the gear teeth. The additional material increases the gear cost. Furthermore, the contiguous internal faces of the ring and hub plate transversely between the side welds are not physically attached by welding or by fasteners. This limited welding attachment also creates a functional disadvantage.

To summarize, the use of separate, performed rings attached to hub plates by mechanical joints or by limited side welding still utilizes considerable bronze material that results in a high price gear, and presents structural deficiencies.

Summary of the invention

The gear includes gear teeth cut in a peripheral layer applied by welding deposit on a hub plate, the material of the peripheral layer, such as bronze, having a lesser functional resistance than the material, such as steel, of the hub plate. The bronze is utilized most efficiently by welding deposition (or overlay) onto the hub plate, building the deposit to a radial thickness and with needed for the gear teeth.

At the interface between the bronze peripheral layer and the steel hub plate, a radially thin dilution zone exists. The bronze peripheral layer has a radial thickness determined by the location of the outside dimension of the dilution zone in a range between a minimal distance inwardly of the root diameter of the gear teeth and substantially the working depth of the gear teeth. For ideal conditions, the dilution zone should be below the engagement or working depth of the gear teeth by a minimal distance. With this structure, the physical strength of the 100% effective bond between the bronze peripheral layer and the steel hub plate anchors the gear teeth to carry the applied loads. Moreover, the bronze requirement is held at the practical minimum for considerable economy.

The radial thickness of the bronze peripheral layer can be defined by the following structural arrangements in which the whole depth or working depth or root diameter of the gear teeth approximates the outside diameter of the dilution zone, or in which the radial thickness is sufficient only to accommodate the conjunctional tooth action of associated gears.

The method of manufacturing the gear comprises the steps of relatively rotating the hub plate and a welding tool, while depositing by welding a layer, of a material such as bronze having a lesser frictional resistance than the material of the hub plate, on the hub plate periphery, and then cutting the gear teeth in the bronze peripheral layer. The radial thickness of the peripheral layer is limited by locating the outside diameter of the dilution zone in a range between substantially the working depth and a minimal distance inwardly of the root diameter of the gear teeth. The radial thickness can be selectively limited to the specific arrangements defined previously.

Brief description of the drawing

FIG. 1 is a side elevational view of associated worm and worm gear;

FIG. 2 is a cross sectional view as taken on line 2—2 of FIG. 1;

FIG. 3 is a cross sectional view of a modified gear assembly;

FIG. 4 is a fragmentary, cross sectional view showing the deposit of a peripheral layer on the hub plate before the gear teeth are cut, and FIG. 5 is a fragmentary, enlarged view of gear teeth of the worm gear.

Description of the preferred embodiment

Referring now by characters of reference to the drawing, and first to FIGS. 1 and 2, it will be understood that the present gear construction and the method of manufacturing such gear is especially adapted for gearing that incorporates essentially a sliding action, such as worm or spiral gears. The disclosure relates to a coacting worm and worm gear, but the principles may be applied to spiral or any other gear in which it is desirable to use a peripheral layer of a material having a lesser frictional resistance than the material of the hub plate.

From FIGS. 1 and 2, it is seen that the worm gear generally indicated by 10 includes a substantially circular hub plate 11, the hub plate 11 being provided with a center opening 12. Located in the center opening 12 of the hub plate 11 is a cylindrical hub 13, the hub 13 having a center bore 14 adapted to receive a compatible shaft (not shown). A keyway 15 is formed in the hub 13 to retain the shaft. The hub 13 is secured to the hub plate 11 by welds 16 about the periphery of the hub 13 and at opposite sides of the hub plate 11.

For reasons which will appear later, the hub plate 11 is constructed of a relatively inexpensive, hard material, such as steel.

A layer 17, of a material such as bronze has a less frictional resistance than the material of the hub plate 11, is applied by welding deposit on the periphery of the hub plate 11. This welding deposit is best shown in FIG. 4. The peripheral layer 17 is applied by relatively rotating the hub plate 11 and a welding tool (not shown).

As the peripheral layer 17 is applied by welding deposit to the hub plate 11, a radially thin dilution zone 20 is formed at the interface between the bronze peripheral layer 17 and the hub plate 11. The dilution zone 20 is a composition of both bronze and steel resulting from the blending of both materials liquifying and fusing under extreme heat. The welding deposit, constituting the peripheral layer 17, is built to a radial thickness and width needed for the gear teeth 21 shown in FIG. 5. The gear teeth 21 are cut in the peripheral layer 17 by the conventional methods.

For practical conservation of bronze, the peripheral layer 17 has a radial thickness A determined by the location of the outside diameter B of the dilution zone 20 in a range between a minimal distance inwardly of the foot diameter C of the gear teeth 21 and substantially the working depth D of the gear teeth 21. Within his range, it will be understood that the working depth D of the gear teeth 21 can approximate, yet be located radially outward of, the outside diameter B of the dilution zone 20. Also, the whole depth E of the gear teeth 21 can approximate the outside diameter B of the dilution zone 20. Also, the root diameter C of the gear teeth 21 can approximate the outside diameter B of the dilution zone 20. From FIG. 5, it is shown that the gear teeth 21 can have a whole depth E extending to, but not in, the dilution zone 20. Moreover, this range includes a peripheral layer 17 having a radial thickness sufficient only to accommodate the conjunctional tooth action of associated gears.

A coacting worm 22 is shown in FIGS. 1 and 2, meshing with the worm gear 10. The worm 22 is keyed to a shaft 23. FIG. 3 illustrates a modified worm gear 24 similar in construction to the worm gear 10 previously described with the exception that the hub plate 11 is secured to the shaft 25 directly by welds 26. The welds 26 extend about the periphery of shaft 25 on opposite sides of the hub plate 11. This structure places the shaft 25 as an integral part of worm gear 24, and as such, materially contributes to the strength, reduces backlash, and reduces the cost by deleting the boring of the hub plate 11, by deleting keys and set screws and the formation of keyways.

The method of manufacturing the worm gear 10 or 24 includes the step of rotating the hub plate 11 relative to a welding tool so that a bronze material can be deposited by welding on the periphery of the hub plate 11. FIG. 4 illustrates a series of superimposed rows of weld beads, each row consisting of a plurality of adjacent, contiguous beads extending about the circumference of the hub plate 11. Of course, the bronze material can be deposited by welding in a different pattern. For example, the peripheral layer 17 can consist of a plurality of superimposed rows of weld beads in which each row consists of a plurality of adjacent, contiguous beads extending transversely of the rim of the hub plate 11 instead of circumferentially. The exact pattern of depositing the bronze material by welding on the periphery of the hub plate 11 is not critical, as long as the peripheral layer 17 is deposited by the welding process so that the layer 17 is an integral part of the hub plate 11.

During the depositing of the bronze material by welding in the formation of the peripheral layer 17, the radial thickness of the peripheral layer 17 is limited by locating the outside diameter B of the dilution zone 20 in a range between substantially the working depth D of the gear teeth 21 to be formed and a minimal distance inwardly of the root diameter C of the gear teeth 21. The peripheral layer 17 can have a radial thickness corresponding to any one of the specific limitations previously defined in the description of the gear construction within the range mentioned. When the peripheral layer 17 is built up to the desired radial thickness, the gear teeth 21 are then cut into the peripheral layer 17.

In this gear construction and with the method of manufacturing such gear, the bronze is utilized most efficiently for considerably economy. The radial thickness of the peripheral layer is held to the practical minimum. In addition, the peripheral layer is fused with the hub plate across the entire width at the interface to provide an integral structure having the most effective bond possible in order to carry the applied loads.

Although the improvements have been described by making detailed reference to preferred embodiments and method of manufacture, such detail is to be understood in an instructive, rather than in any restrictive sense, many variants being possible within the scope of the claims hereunto appended.

We claim as our invention:

1. A gear, comprising:
   (a) a hub plate,
   (b) a layer applied by welding deposit on the periphery of the hub plate, the material of the peripheral layer being of a lesser frictional resistance than the material of the hub plate,
   (c) an interface between the hub plate and the peripheral layer having a radially thin dilution zone, and
   (d) a plurality of gear teeth in the peripheral layer.

2. A gear as defined in claim 1, in which:
   (e) the peripheral layer has a radial thickness determined by the location of the outside diameter of the dilution zone in a range between a minimal distance inwardly of the root diameter of the gear teeth and substantially the working depth of the gear teeth.

3. A gear as defined in claim 1, in which:
   (e) the working depth of the gear teeth approximates, yet is radially outward of, the outside diameter of the dilution zone.

4. A gear as defined in claim 1, in which:
   (e) the whole depth of the gear teeth approximates the outside diameter of the dilution zone.

5. A gear as defined in claim 1, in which:
   (e) the root diameter of the gear teeth approximates the outside diameter of the dilution zone.

6. A gear as defined in claim 1, in which:
   (e) the gear teeth have a whole depth extending substantially to, but not in, the dilution zone.

7. A gear as defined in claim 1, in which:
   (e) the peripheral layer has a radial thickness sufficient only to accommodate the conjunctional tooth action of associated gears.

8. The method of manufacturing a gear, comprising the steps of:
   (a) relatively rotating a hub plate and a welding tool,
   (b) depositing by welding a layer of a material of a lesser frictional resistance than the material of the hub plate, on the periphery of the hub plate, and
   (c) cutting gear teeth in the peripheral layer.

9. The method of manufacturing a gear as defined in claim 8, including the step of:
   (d) limiting the radial thickness of the peripheral layer by locating the outside diameter of the dilution zone, between the hub plate and peripheral layer, in a range between substantially the working depth of the gear teeth and a minimal distance inwardly of the root diameter of the gear teeth.

10. The method of manufacturing a gear as defined in claim 8, including the further step of:

(d) limiting the radial thickness of the peripheral layer outwardly from a dilution zone between the hub plate and peripheral layer to that required to accommodate the gear teeth cut in the peripheral layer.

11. The method of manufacturing a gear as defined in claim 8, including the further step of:
   (d) limiting the radial thickness of the peripheral layer outwardly from a dilution zone between the hub plate and peripheral layer to approximately the working depth of the gear teeth.

12. The method of manufacturing a gear as defined in claim 8, including the further step of:
   (d) limiting the radial thickness of the peripheral layer outwardly from a dilution zone between the hub plate and peripheral layer to aproximately the whole depth of the gear teeth.

13. The method of manufacturing a gear as defined in claim 8, including the further step of:
   (d) limiting the root diameter of the gear teeth to approximately the outside diameter of the dilution zone between the hub plate and peripheral layer.

14. The method of manufacturing a gear as defined in claim 8, including the further step of:
   (d) limiting the whole depth of the gear teeth substantially to, not in, the dilution zone between the hub plate and peripheral layer.

15. The method of manufacturing a gear as defined in claim 8, including the step of:
   (d) limiting the radial thickness of the peripheral layer outwardly from the dilution zone between the hub plate and peripheral layer to accommodate the conjunctional tooth action of associated gears.

References Cited

UNITED STATES PATENTS

| | | |
|---|---|---|
| 1,338,672 | 5/1920 | Calkins. |
| 1,358,191 | 11/1920 | Fitzpatrick _____ 74—446 |
| 2,688,180 | 9/1954 | Morton et al. _____ 29—529 X |

LEONARD H. GERIN, Primary Examiner

U.S. Cl. X.R.

29—159.2, 194, 529; 74—425